US012744744B2

(12) United States Patent
Power et al.

(10) Patent No.: US 12,744,744 B2
(45) Date of Patent: Sep. 22, 2026

(54) SYSTEMS AND METHODS FOR PREDICTING AND MANAGING OVERCAPACITY IN SYSTEM NETWORK

(71) Applicant: Optum Services (Ireland) Limited, Dublin (IE)

(72) Inventors: Dean Power, Dundrum (IE); Jacques Bellec, Shankill (IE)

(73) Assignee: Optum Services (Ireland) Limited, Dublin (IE)

( * ) Notice: Subject to any disclaimer, the term of this patent is extended or adjusted under 35 U.S.C. 154(b) by 104 days.

(21) Appl. No.: 18/526,365

(22) Filed: Dec. 1, 2023

(65) Prior Publication Data

US 2025/0184283 A1 Jun. 5, 2025

(51) Int. Cl.

| | |
|---|---|
| ***H04L 47/762*** | (2022.01) |
| ***H04L 41/16*** | (2022.01) |
| ***H04L 47/83*** | (2022.01) |

(52) U.S. Cl.

CPC ............ *H04L 47/762* (2013.01); *H04L 41/16* (2013.01); *H04L 47/83* (2022.05)

(58) Field of Classification Search

CPC ....... H04L 47/762; H04L 47/83; H04L 47/16; H04L 47/70; H04L 47/76; H04L 47/808; H04L 41/16; G16H 40/20

See application file for complete search history.

(56) References Cited

U.S. PATENT DOCUMENTS

| | | | | |
|---|---|---|---|---|
| 8,799,009 | B2 | 8/2014 | Mellin et al. | |
| 2008/0184000 | A1* | 7/2008 | Kawaguchi | G06F 3/0665 711/171 |
| 2012/0232926 | A1 | 9/2012 | Boyle et al. | |
| 2020/0120037 | A1* | 4/2020 | Zhang | G06Q 50/40 |
| 2020/0241921 | A1* | 7/2020 | Calmon | G06N 3/045 |
| 2021/0160142 | A1* | 5/2021 | Thai | H04L 41/22 |
| 2022/0329524 | A1* | 10/2022 | Sinha | H04L 41/0896 |
| 2022/0391965 | A1* | 12/2022 | Putrevu | G06N 20/20 |
| 2023/0011521 | A1* | 1/2023 | Balakrishnan | G16H 40/67 |

FOREIGN PATENT DOCUMENTS

| | | | | |
|---|---|---|---|---|
| WO | 2018112185 | A1 | 6/2018 | |
| WO | WO-2023148932 | A1 * | 8/2023 | G06Q 50/40 |

* cited by examiner

*Primary Examiner* — Rachel J Hackenberg
(74) *Attorney, Agent, or Firm* — Bookoff McAndrews, PLLC

(57) ABSTRACT

Systems and methods are disclosed for determining optimal resource allocation options for network systems. The method includes receiving real-time data associated with a plurality of systems; generating one or more features associated with a first system of the plurality of systems based on at least a portion of the real-time data; generating, via input of one or more features into a machine learning model, a prediction that the first system is approaching a capacity threshold; determining one or more probabilities associated with respective one or more second systems of the plurality of systems, each of the one or more probabilities indicating a preferability of the respective second system for reallocating one or more resources from the first system; and simulating the reallocation across the plurality of systems based on the one or more probabilities associated with the respective one or more second systems.

20 Claims, 8 Drawing Sheets

SYSTEMS AND METHODS FOR PREDICTING AND MANAGING OVERCAPACITY IN SYSTEM NETWORK

TECHNICAL FIELD

This present disclosure relates generally to the field of data processing and predictive analytics. In particular, the present disclosure relates to analyzing real-time data for predicting an event in the network systems and determining the most optimal resource allocation options for the network systems.

BACKGROUND

Conventional methods implement a system-specific approach that predicts an event for a particular system and mitigates the predicted event for that particular system without considering the impact on other system(s) in the network. For example, when an overcapacity event occurs at a specific system, the traditional methods reallocate the resources to other system(s) in the network without considering the impact of that reallocation on the other system(s) or the entire network. These are isolated approaches that neither communicate the overcapacity event to the other system(s) nor consider the network systems as a whole during the reallocation of the resources. Such system-specific and isolated approaches do not account for potential cascading overcapacity events at the other system(s) as a consequence of the reallocated resources.

SUMMARY OF THE DISCLOSURE

The present disclosure solves the technical challenges typically encountered during the use of a conventional resource reallocation technique, such as those discussed above. Specifically, the present disclosure solves the technical challenges by providing a centralized system that performs holistic network optimization (e.g., that considers the network systems as a whole), system-specific overcapacity prediction using a machine-learning model, cascading overcapacity prediction using simulation techniques, and weighing of user-related data for generating the most optimal recommendation(s) to the network systems for resource reallocation.

In some embodiments, a computer-implemented method includes: receiving, by one or more processors, real-time data associated with a plurality of systems; generating, by the one or more processors, one or more features associated with a first system of the plurality of systems based on at least a portion of the real-time data; generating, by the one or more processors via input of the one or more features into a machine learning model, a prediction that the first system is approaching a capacity threshold; determining, by the one or more processors, one or more probabilities associated with respective one or more second systems of the plurality of systems, each of the one or more probabilities indicating a preferability of the respective second system for reallocating one or more resources from the first system; and simulating, by the one or more processors, the reallocation across the plurality of systems based on the one or more probabilities associated with the respective one or more second systems.

In some embodiments, a system includes: one or more processors of a computing system; and at least one non-transitory computer readable medium storing instructions which, when executed by the one or more processors, cause the one or more processors to perform operations including: receiving real-time data associated with a plurality of systems; generating one or more features associated with a first system of the plurality of systems based on at least a portion of the real-time data; generating, via input of the one or more features into a machine learning model, a prediction that the first system is approaching a capacity threshold; determining one or more probabilities associated with respective one or more second systems of the plurality of systems, each of the one or more probabilities indicating a preferability of the respective second system for reallocating one or more resources from the first system; and simulating the reallocation across the plurality of systems based on the one or more probabilities associated with the respective one or more second systems.

In some embodiments, a non-transitory computer readable medium storing instructions which, when executed by one or more processors of a computing system, cause the one or more processors to perform operations including: receiving real-time data associated with a plurality of systems; generating one or more features associated with a first system of the plurality of systems based on at least a portion of the real-time data; generating, via input of the one or more features into a machine learning model, a prediction that the first system is approaching a capacity threshold; determining one or more probabilities associated with respective one or more second systems of the plurality of systems, each of the one or more probabilities indicating a preferability of the respective second system for reallocating one or more resources from the first system; and simulating the reallocation across the plurality of systems based on the one or more probabilities associated with the respective one or more second systems.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

DETAILED DESCRIPTION OF EMBODIMENTS

Figure 1:
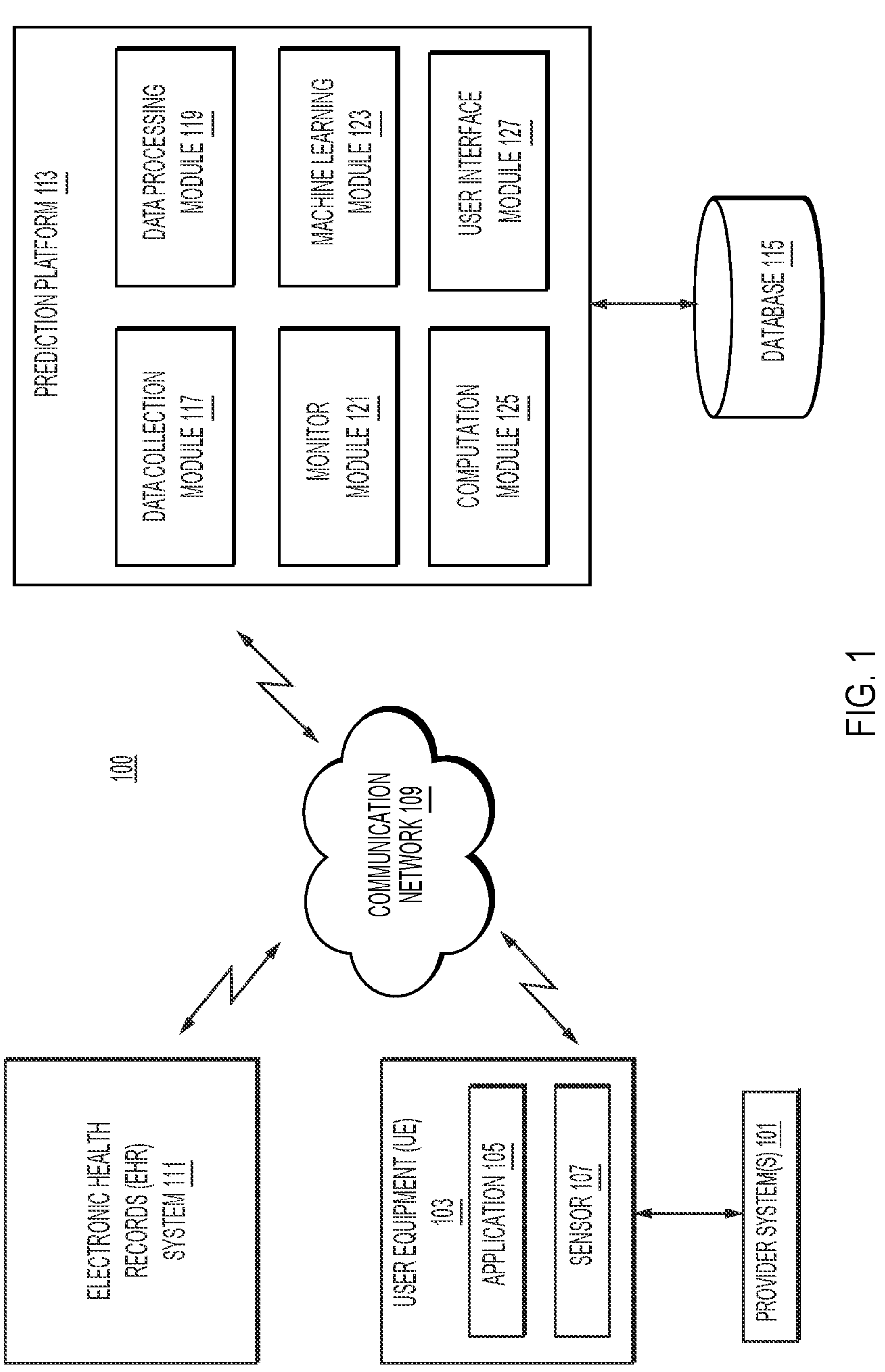
FIG. 1 is a diagram showing an example of a system for predicting and managing overcapacity events, according to aspects of the disclosure.

This present disclosure relates generally to the field of data processing and predictive analytics. In particular, the present disclosure relates to analyzing real-time data for predicting an event in the network systems and determining the most optimal resource allocation options for the network systems.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods for predicting overcapacity events in network systems and determining the most optimal resource allocation options for the network systems.

In many industries, timeliness of service is a key factor that contributes to the quality of service. Several factors cause a delay in service, and two of the key factors are over-demand and under-supply. In the short-term, over-demand can occur due to surges in user numbers requesting service, and under-supply occurs due to short-staffing for providing service. While contingency plans may be in place to deal with delays in service when they occur at a particular facility, there is no known mechanism by which other providers in the network are warned about potential cascading overcapacity events. When an overcapacity event occurs at the particular provider's facility, users are reallocated to other providers in the network to reduce the impact of the event. However, such user reallocation can have unintended consequences, such as creating overcapacity events at other facilities. For example, while redirecting users to nearby providers in the network to optimize local capacity, the existing methods do not account for the capacity of the network as a whole. The existing approaches may be able to optimize the local timeliness of service but at the detriment of the timeliness of service of the network as a whole. This knock-on effect of user redirection from an overcapacity facility is currently unpredictable, and a single short-term overcapacity event at the particular provider's facility could cause a chain reaction of unknown impact on the overall timeliness of service for the other providers in the entire network.

Conventional approaches to user reallocation do not provide functionality for making data-driven decisions due to the system-specific and isolated approaches that neither communicate the overcapacity event at a specific system to the other system(s) nor consider the network systems as a whole during the reallocation of the resources (e.g., users, etc.). The conventional methods are technically challenged in understanding the complex interactions between the users, the providers, and the technologies as they endeavor to develop processes for resource reallocation. As a specific example, in the healthcare industry, the conventional methods are technically challenged in integrating electronic health records (EHR) and other data sources for monitoring and optimizing, in real-time or near real-time, the processes for resource reallocation (e.g., user/patient reallocation). These methods utilize reports generated by the providers to optimize the processes for user reallocation, however, there are biases and under-reporting in such reports, making them unreliable. Hence, there is a need for advanced data-driven models, methods, and tools for estimating the severity and frequency of overcapacity events to understand their potential risks for the entire network.

System 100 overcomes the technical shortcomings of the existing, conventional technologies by identifying and predicting the severity of potential cascading overcapacity events, and triggering contingency plans to prevent or mitigate their impact on the timeliness of service provision for the providers (e.g., provider system(s) 101) in a network. For example, the system 100 predicts overcapacity events and recommends the best course of action for each provider in the network through a real-time interface at the point of service. The system 100 provides real-time recommendations to the providers based on the current network state, and each provider can make individual decisions from the real-time recommendations while still remaining closely connected in the network calculation. The system 100 updates, in real-time, recommendations for one or more providers based on the immediate actions of at least one provider, resulting in efficiency and optimization in the resource management process within the system network.

More specifically, the present disclosure provides embodiments that solve the technical shortcoming in the field of data processing and predictive analytics, and that lead to significant technical improvements in the same field. The system 100 introduces an exhaustive, systematic, and sophisticated process for a centralized system that performs holistic network optimization, system-specific overcapacity prediction, and cascading overcapacity prediction, and incorporates user preferences into the decision-making process for resource reallocation. In one embodiment, the system 100 is integrated with EHR and various data sources to obtain real-time data on the users (e.g., patient numbers) and employee volume (e.g., staffing levels) at each provider in the network. The system 100 processes real-time data to continuously monitor the capacity of each provider and predicts when a particular provider is approaching overcapacity. The system 100 while predicting an initial overcapacity event at one provider determines potential cascading overcapacity events at other provider(s) in the same network.

The system 100 further improves the state of conventional technologies by utilizing a machine learning model (e.g., a time-series machine learning model) trained on historical data to learn the patterns and trends that are indicative of an impending overcapacity event, and makes accurate predictions on the likelihood and severity of such events based on the current data (e.g., real-time data) that is inputted to the machine learning models. The system 100 also performs a cascading overcapacity prediction using simulation techniques, and then generates notification(s) regarding potential chain reaction of unknown impact on the overall timeliness of service for the entire network. The system 100 provides recommendations to prevent or mitigate the impact of the predicted overcapacity event. Such early predictions and recommendations by the system 100 allow the providers to undertake preventive or mitigation measures. In such a manner, the system 100 identifies potential overcapacity events that are not immediately apparent or predictable based on the capacity and utilization of individual providers alone. The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

Reference to any particular activity is provided in this disclosure only for convenience and not intended to limit the disclosure. A person of ordinary skill in the art would recognize that the concepts underlying the disclosed devices and methods may be utilized in any suitable activity. For example, while the present disclosure is explained in the context of healthcare management, one of ordinary skill would understand the applicability of the described systems and methods to similar tasks in a variety of contexts or environments.

FIG. 1 is a diagram showing an example of a system for predicting and managing overcapacity events, according to aspects of the disclosure. FIG. 1 includes the system 100 that comprises provider system(s) 101, user equipment (UE) 103*a*-103*n* (collectively referred to as UE 103) that includes applications 105*a*-105*n* (collectively referred to as an application 105) and sensors 107*a*-107*n* (collectively referred to as a sensor 107), a communication network 109, an EHR system 111, a prediction platform 113, and a database 115.

In one embodiment, provider system(s) 101 (also referred to as a provider(s) herein) is a single service-providing entity or a group of service-providing entities (e.g., hospital(s), private clinic(s), etc.) within a network that provides health-related service(s) to one or more users (e.g., patients). In one instance, provider system(s) 101 includes a provider experiencing or potentially experiencing an overcapacity event (referred to as a first system) and other providers to whom the users can be reallocated for mitigating the overcapacity event (referred to as one or more second systems) within a network. In another embodiment, the provider system(s) 101 is one or more department(s) within the provider system(s) 101 (e.g., emergency rooms at the hospital(s) or private clinic(s), beds at the hospital(s) or private clinic(s), ambulances of the hospital(s) or private clinic(s), inpatient admissions by the hospital(s) or private clinic(s), etc.) that administer health-related service(s) to one or more users. The users can be reallocated between the various departments of the provider system(s) to mitigate the overcapacity event. In a further embodiment, the provider system(s) 101 is a system that is managed or hosted by the service-providing entity for providing health-related service(s).

In one embodiment, the UE 103 includes, but is not restricted to, any type of mobile terminal, wireless terminal, fixed terminal, or portable terminal. Examples of the UE 103 include, but are not restricted to, a mobile handset, a wireless communication device, a station, a unit, a device, a multimedia computer (e.g., computer system 700), a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. The UE 103 facilitates various input means for receiving information, including, but not restricted to, a touch screen capability, a keyboard and keypad data entry, a voice-based input mechanism, and the like. For example, one or more users (e.g., patients) provide health information or any other relevant information (e.g., contextual information, location information, etc.) via their respective UE 103. For example, the providers (e.g., provider system(s) 101) provide user volume information (e.g., patient volume data), resource utilization information, or staffing information via their respective UE 103. In addition, the UE 103 is configured with different features for generating, sharing, and viewing of visual content. For example, the UE 103 displays recommendation(s) for reallocation or a simulation of a cascading effect of reallocation to the providers. Any known and future implementations of the UE 103 are also applicable.

In one embodiment, the application 105 includes various applications such as, but not restricted to, content provisioning applications, notification services, software applications, networking applications, multimedia applications, media player applications, camera/imaging applications, storage services, contextual information determination services, location-based services, and the like. In one embodiment, one of the application 105 at the UE 103 acts as a client for the prediction platform 113 and performs one or more functions associated with the functions of the prediction platform 113 by interacting with the prediction platform 113 over the communication network 109.

By way of example, each sensor 107 includes any type of sensor. In one embodiment, the sensors 107 include, for example, a network detection sensor for detecting wireless signals or receivers for different short-range communications (e.g., Bluetooth, Wi-Fi, Li-Fi, near field communication (NFC), etc.) from the communication network 109, a global positioning sensor for gathering location data (e.g., real-time location information of the user(s) (e.g., patient(s)) and/or the provider(s) (e.g., provider system(s) 101)), a camera/imaging sensor for gathering image data (e.g., images of medical reports of the user(s), etc.), an audio recorder for gathering audio data (e.g., recordings of medical treatments, medical diagnosis, associated with the user(s)), and the like.

In one embodiment, various elements of the system 100 communicate with each other through the communication network 109. The communication network 109 supports a variety of different communication protocols and communication techniques. In one embodiment, the communication network 109 allows the UE 103 and the EHR system 111 to communicate with the prediction platform 113. The communication network 109 of the system 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, the EHR system 111 is a fully integrated and automated system for capturing medical data associated with the user(s) (e.g., patient(s)) from various databases (e.g., state government databases, federal government databases, public or private health institutions databases, etc.), providers, and other related entities/systems, to generate electronic records of the user(s) for transmission to other systems (e.g., the prediction platform 113). The EHR system 111 transforms a patient's medical chart from a static record into a dynamic, comprehensive record linked to various databases. In one instance, the electronic record includes patient information (e.g., name, address, phone number, date of birth, social security number, etc.), medical information (e.g., diagnosis, test results, prescribed medications, professional services provided, notes entered by the physician or other healthcare personnel, etc.), financial information (e.g., billing information, payment information, transaction history, etc.), insurance information, and any other relevant information. In another embodiment, the EHR system 111 receives images of medical records uploaded by the user(s) via application 105 of their respective UE 103. The EHR system 111 then extracts textual data from the images of medical records to generate an electronic record.

In one embodiment, the prediction platform 113 is a platform with multiple interconnected components. The prediction platform 113 includes one or more servers, intelligent networking devices, computing devices, components, and corresponding software for predicting and managing overcapacity in a network of a plurality of systems. The prediction platform 113 receives real-time data associated with the providers from various data sources. The prediction platform 113 processes the real-time data to generate feature(s) associated with at least one provider (e.g., first system) to input into a machine learning model for generating a prediction that at least one provider is approaching overcapacity. The prediction platform 113 also determines probabilities associated with other providers (e.g., second system(s)), and the probabilities indicate a preferability of the respective second system for reallocating users. The prediction platform 113 further determines a cascading effect of the reallocation by simulating the reallocation across the plurality of systems.

In one example embodiment, the prediction platform 113 predicts an overcapacity event at a provider (e.g., P1 in FIG. 4A), or if an overcapacity has already occurred at the provider, a cascading effect of resource (e.g., user or patient) reallocation from the provider is simulated for several time steps at the level of the entire network of providers (e.g., network 400 of FIGS. 4A-4C), and overcapacity risks are generated for all the other providers (e.g., P2, P3, P4, and P5 in FIGS. 4A-4C) based on the probability of patients being reallocated from P1. The prediction platform 113 transmits alerts to the providers most at risk, warning them of the potential of increased future patient numbers resulting from a predicted, or actual, overcapacity event at P1. In addition to an early warning system, the prediction platform 113 generates a recommended course of action based on the predicted severity of the event and the available resources and options. For example, the prediction platform 113 recommends measures such as redirecting patients to specific alternative service facilities based on their needs and preferences, bringing in additional staff, or implementing other measures to increase capacity or reduce demand for service.

In one embodiment, the prediction platform 113 comprises a data collection module 117, a data processing module 119, a monitor module 121, a machine learning module 123, a computation module 125, a user interface module 127, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one embodiment, the data collection module 117 collects, in real-time or near real-time, relevant data associated with the users (e.g., patients) and/or the providers (e.g., provider system(s) 101) through various data collection techniques. In one embodiment, the relevant data associated with the users include past data, medical information, personal information, financial information, insurance information, etc. In one embodiment, the relevant data associated with the providers include past data, patient volume information, resource utilization information, staffing information, location information (e.g., distance information, travel duration) shared facilities data, or membership information. The data collection module 117 uses a web-crawling component to access various data sources (e.g., EHR system 111, database 115, other sources of real-time data on patient numbers and staffing levels, such as scheduling and appointment systems, patient flow data, etc.) to collect the relevant data. In one embodiment, the data collection module 117 includes various software applications (e.g., data mining applications in Extended Meta Language (XML)) that automatically search for and return relevant data associated with the users and/or the providers. In another embodiment, the data collection module 117 collects images (e.g., images of medical records) uploaded by the users via the user interface of UE 103.

In one embodiment, the data collection module 117 transmits the collected data to the data processing module 119 for data standardization and/or data cleansing. In one embodiment, data standardization includes standardizing and unifying data. The data processing module 119 converts the collected data into a common format (e.g., machine readable form), that is easily processed by other modules and platforms. In one embodiment, the data cleansing technique includes removing or correcting erroneous data (e.g., typographical errors) or validating and correcting values against a known list of entities. The data cleansing technique also includes cleaning data by cross-checking the data with a validated data set, standardizing the data by changing a reference data set to a new standard (e.g., use of standard codes), and/or the like. Additionally, the data cleansing technique includes data enhancement, where data is made more complete by adding related information.

In one embodiment, the data processing module 119 transmits the processed data to the monitor module 121. The monitor module 121 generates feature(s) associated with the provider(s) (e.g., first system) based on the processed data. In one instance, the monitor module 121 utilizes the processed data (e.g., patient volume information) to determine real-time capacity information at each of the providers (e.g., first and second systems) within the network. In another instance, the monitor module 121 utilizes the processed data (e.g., resource utilization information) to determine real-time resource availability (e.g., rooms, ambulances, beds, etc.) at each of the providers within the network. In a further instance, the monitor module 121 utilizes the processed data (e.g., staffing information) to determine real-time availability of medical staff (e.g., physicians, surgeons, nurses, etc.) at each of the providers within the network. The monitor module 121 inputs the generated feature(s) into a machine learning model trained and managed by the machine learning module 123.

In one embodiment, the machine learning module 123 is configured for supervised machine learning, utilizing training data (e.g., training data 612 illustrated in the training flow chart 600). The trained model is configured for analyzing historical data associated with the providers (e.g., first and second systems) to learn patterns indicative of an overcapacity event. In one example embodiment, the machine learning module 123 performs model training using training data (e.g., data from other modules, that contains input and correct output, to allow the model to learn over time). The training is performed based on the deviation of a processed result from a documented result when the inputs are fed into the machine learning model (e.g., an algorithm measures its accuracy through the loss function, adjusting until the error has been sufficiently minimized). In some embodiments, the trained model utilizes exponential smoothing, autoregressive integrated moving average (ARIMA), or long short-term memory (LSTM) neural networks to analyze one or more features associated with the providers for generating an overcapacity prediction.

In one embodiment, the machine learning module 123 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 123 implements various machine learning techniques, e.g., neural network (e.g., recurrent neural networks, graph convolutional neural networks, deep learning neural networks), decision tree learning, random forest, association rule learning, inductive programming logic, K-nearest neighbors, cox proportional hazards model, support vector machines, Bayesian models, Gradient boosted machines (GBM), LightGBM (LGBM), Xtra tree classifier, etc. Implementation of the machine learning module 123 is discussed in detail below.

In one embodiment, the computation module 125 assigns a value to each edge attribute that defines the edges (e.g., connections between the plurality of systems within a network). The value is assigned based on the influence of the edge attribute during past user reallocations. The computation module 125 calculates an edge weight for each of the edges based on the assigned value, and normalizes the edge weight by dividing the edge weight by a sum of edge weights. The computation module 125 outputs probabilities associated with the other provider(s) in the network (e.g., second systems), each probability being representative of a preferability of the corresponding provider (e.g., the corresponding second system) for reallocating one or more users from a provider for which an overcapacity event has been predicted (e.g., the first system). In another embodiment, the computation module 125 calculates an uncertainty value for the iterated simulation that simulates reallocation across the systems within the network based on the probabilities. Such uncertainty value is increased with each iterated simulation until a pre-determined uncertainty threshold is reached. The computation module 125 also determines an average variance in the utilization of actions (e.g., reallocations) based on the prediction and/or the cascading effect during the iterated simulation.

The user interface module 127 enables a presentation of a graphical user interface (GUI) in the UE 103 that facilitates visualization of: (i) a graph representing the providers (e.g., first and second systems) as nodes and connections between the providers as edges, (ii) a simulation of the cascading effect of the reallocation across the providers in a network, and/or (iii) one or more recommendations based on the prediction and/or the cascading effect. In one embodiment, the user interface module 127 employs various application programming interfaces (APIs) or other function calls corresponding to the application 105 on the UE 103, thus enabling the display of graphics primitives such as graphs, edges, icons, menus, buttons, data entry fields, etc. The user interface module 127 causes interfacing of guidance information to include, at least in part, one or more annotations, audio messages, video messages, or a combination thereof pertaining to the recommended actions. The user interface module 127 also comprises a variety of interfaces, for example, interfaces for data input and output devices, referred to as I/O devices, storage devices, and the like. Still further, the user interface module 127 is configured to operate in connection with augmented reality (AR) processing techniques, wherein various applications, graphic elements, and features interact.

The above presented modules and components of the prediction platform 113 are implemented in hardware, firmware, software, or a combination thereof. Though depicted as a separate entity in FIG. 1, it is contemplated that the prediction platform 113 is also implemented for direct operation by the respective UE 103. As such, the prediction platform 113 generates direct signal inputs by way of the operating system of the UE 103. In another embodiment, one or more of the modules 117-127 are implemented for operation by the respective UEs, as the prediction platform 113. The various executions presented herein contemplate any and all arrangements and models.

In one embodiment, the database 115 is any type of database, such as relational, hierarchical, object-oriented, and/or the like, wherein data are organized in any suitable manner, including data tables or lookup tables. In one embodiment, the database 115 accesses various data sources and/or stores content associated with the user(s) (e.g., patient(s)), provider(s) (e.g., first and second systems), the UE 103, and the prediction platform 113, and manages multiple types of information that provide means for aiding in the content provisioning and sharing process. It is understood that any other suitable data may be included in the database 115. In another embodiment, the database 115 includes a machine learning based training database with a pre-defined mapping defining a relationship between various input parameters and output parameters based on various statistical methods. For example, the training database includes machine learning algorithms to learn mappings between input parameters related to the user(s) and/or the provider(s). In one example embodiment, the training database includes a dataset that includes data collections that are not subject-specific, e.g., data collections based on population-wide observations, local, regional or super-regional observations, and the like. The training database is routinely updated and/or supplemented based on the machine learning methods.

By way of example, the UE 103, the EHR system 111, and the prediction platform 113 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
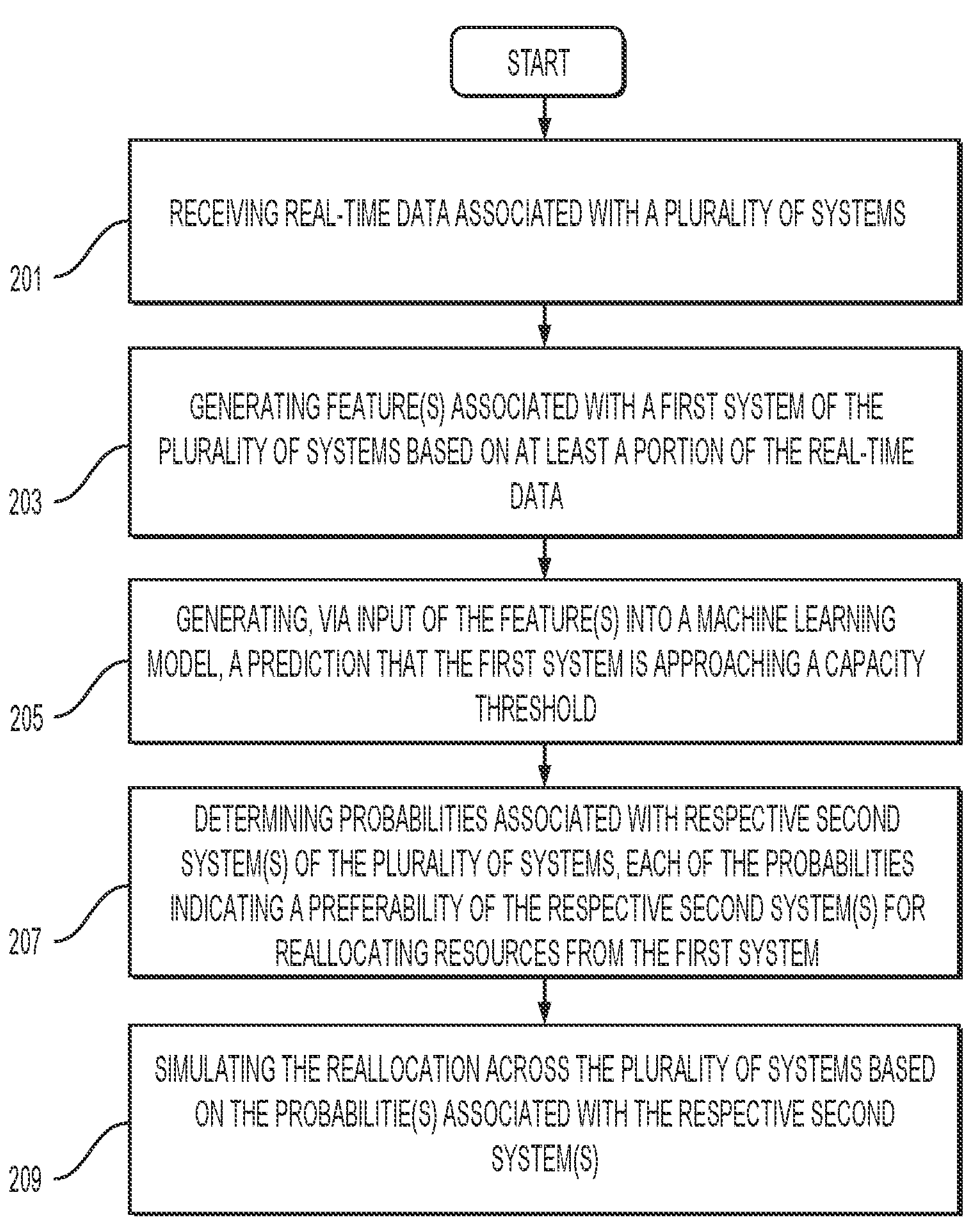
FIG. 2 is a flowchart of a process for predicting and managing overcapacity in a network of plurality of systems, according to aspects of the disclosure.

FIG. 2 is a flowchart of a process for predicting and managing overcapacity in a network of plurality of systems, according to aspects of the disclosure. In various embodiments, the prediction platform 113 and/or any of the modules 117-127 performs one or more portions of the process 200 and are implemented using, for instance, one or more processors and one or more memory devices, such as those shown in FIG. 7. As such, the prediction platform 113 and/or any of modules 117-127 provide means for accomplishing various parts of the process 200, as well as means for accomplishing embodiments of other processes described herein in conjunction with other components of the system 100. Although the process 200 is illustrated and described as a sequence of steps, it is contemplated that various embodiments of the process 200 are performed in any order or combination and need not include all of the illustrated steps.

In step 201, the prediction platform 113 receives real-time data associated with a plurality of systems (e.g., first and second systems).

In step 203, the prediction platform 113 generates feature(s) associated with a first system of the plurality of systems (e.g., P1 of the network 400 in FIGS. 4A-4C) based on at least a portion of the real-time data.

In step 205, the prediction platform 113 generates, via input of the feature(s) into a machine learning model, a prediction that the first system is approaching a capacity threshold. In one embodiment, the machine learning model utilizes exponential smoothing, ARIMA, or LSTM neural networks to analyze the feature(s) for generating the prediction of overcapacity at any of the plurality of systems. In one embodiment, the machine learning model is a trained machine learning model that processes historical data associated with the plurality of systems to learn patterns indicative of an overcapacity event.

Figure 4A:
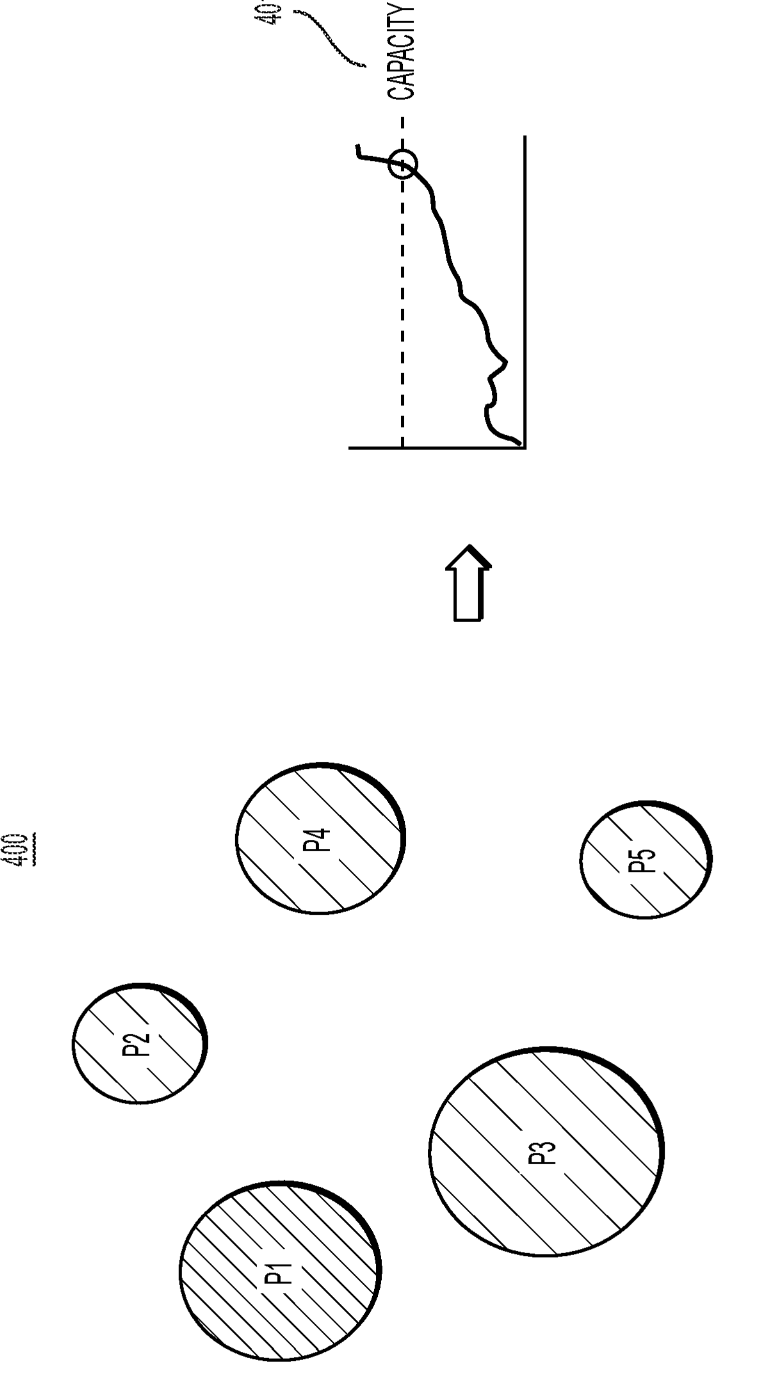
FIGS. 4A-4C are graph diagrams that represent the plurality of providers and their interconnectivity to one another, according to aspects of the disclosure.
Figure 4C:
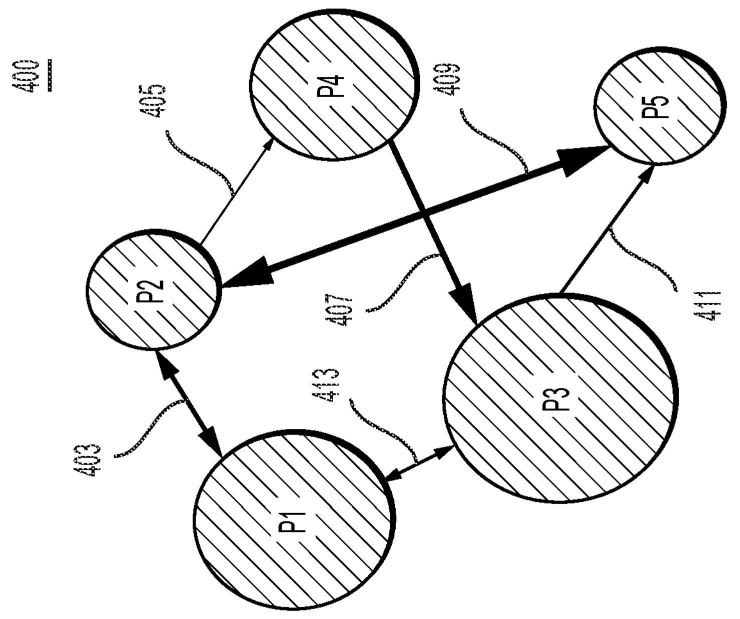
Figure 4B:
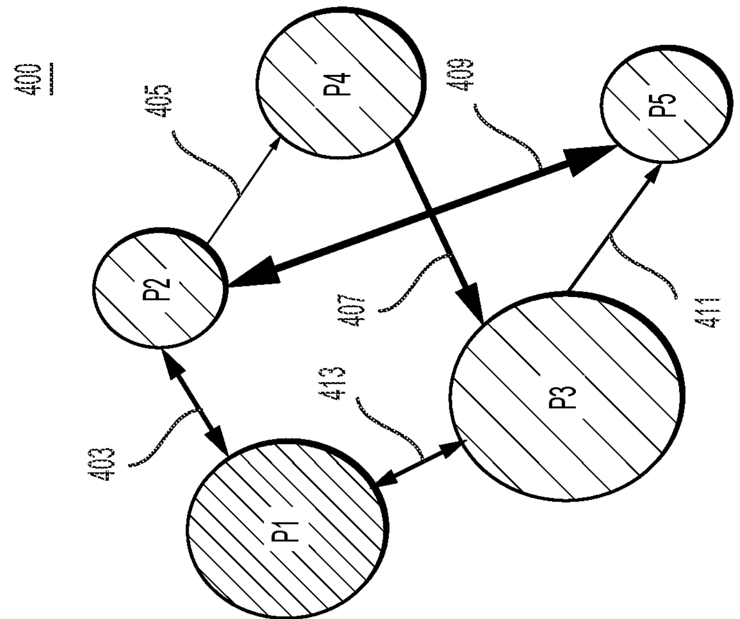

In step 207, the prediction platform 113 determines one or more probabilities associated with the respective one or more second systems of the plurality of systems (e.g., P2, P3, P4, and P5 of the network 400 in FIGS. 4A-4C). Each probability indicates a preferability of a respective second system for reallocating resource(s) (e.g., users, patients, etc.) from the first system. In one embodiment, the prediction platform 113 generates a graph representing the plurality of systems as nodes and the connections between the plurality of systems as edges based on the real-time data associated with the plurality of systems. Each of the nodes is defined by one or more node attributes (e.g., user volume information, resource utilization information, staffing information, etc.), and each of the edges is defined by one or more edge attributes (e.g., distance information, travel duration, shared facilities data, membership information, cost data, etc.).

In one embodiment, the prediction platform 113 processes historical data associated with the plurality of systems to determine the influence of each of the edge attributes on past resource reallocation. The prediction platform 113 assigns a value to each of the one or more edge attributes based on the respective determined influence. The prediction platform 113 calculates an edge weight for each of the edges based on the respective assigned value. The prediction platform 113 normalizes the edge weight for each of the edges to output each of the one or more probabilities associated with the respective second system(s). The normalizing includes dividing the edge weight for each of the edges by a sum of the edge weights of all the edges.

In step 209, the prediction platform 113 simulates the reallocation across the plurality of systems based on the one or more probabilities associated with the respective one or more second systems. For example, the prediction platform 113 simulates a cascading effect of the reallocation across the plurality of systems based on the probabilities associated with the respective second system(s). The simulation of the reallocation across the plurality of systems is iterated for a pre-determined duration or until an uncertainty threshold is reached. In one embodiment, the prediction platform 113 calculates an uncertainty value for each iterated simulation, and the uncertainty value is increased with each iterated simulation. The uncertainty value indicates an average variance in the reallocation of the resource(s) to second system(s). The prediction platform 113 pauses or ends the simulation upon determining the uncertainty value is equal to or above the uncertainty threshold.

In one embodiment, the prediction platform 113 groups the resource(s) into subset(s) based on the probabilities associated with the respective second system(s). The prediction platform 113 simulates the reallocating of the subset(s) to the respective second system(s). In one embodiment, the prediction platform 113 determines that the simulation does not indicate overcapacity at any of the plurality of systems. For example, the prediction platform 113 determines that the cascading effect of the reallocation does not include overcapacity at any of the plurality of systems. Based on this determination, the prediction platform 113 initiates action(s) based on the prediction and/or the simulation (e.g., the cascading effect). The action(s) includes providing a reallocation recommendation based on the probabilities.

In another embodiment, the prediction platform 113 determines that the simulation indicates overcapacity at one or more of the plurality of system. For example, the prediction platform 113 determines that the cascading effect of the reallocation includes overcapacity at one or more of the plurality of systems. Based on this determination, the prediction platform 113 generates multiple sets of alternative probabilities associated with the respective second system(s). The alternative probabilities indicate a modified preferability of the respective second system for reallocating the resource(s) from the first system. The prediction platform 113 re-simulates the reallocation across the plurality of the systems multiple times based on the respective multiple sets of one or more alternative probability associated with the respective one or more second systems, wherein the re-simulations are associated with a reduced risk of overcapacity to the plurality of systems. For example, the prediction platform 113 determines alternative cascading effects of the reallocation by simulating the reallocation across the plurality of systems multiple times based on the respective multiple sets of alternative probabilities associated with the respective second system(s), wherein the alternative cascading effects are associated with a reduced risk of overcapacity to the plurality of systems. The prediction platform 113 selects, from the re-simulations (e.g., from the alternative cascading effects), a re-simulation (e.g., an alternative cascading effect) that is associated with a set of alternative probabilities that are most similar to the one or more probabilities (e.g., the one or more probabilities determined in step 207). The prediction platform 113 initiates action(s) based on the prediction and/or the selected re-simulation (e.g., the selected alternative cascading effect). The action(s) include providing a reallocation recommendation based on the set of alternative probabilities that correspond to the selected re-simulation (e.g., the selected alternative cascading effect).

Figure 3:
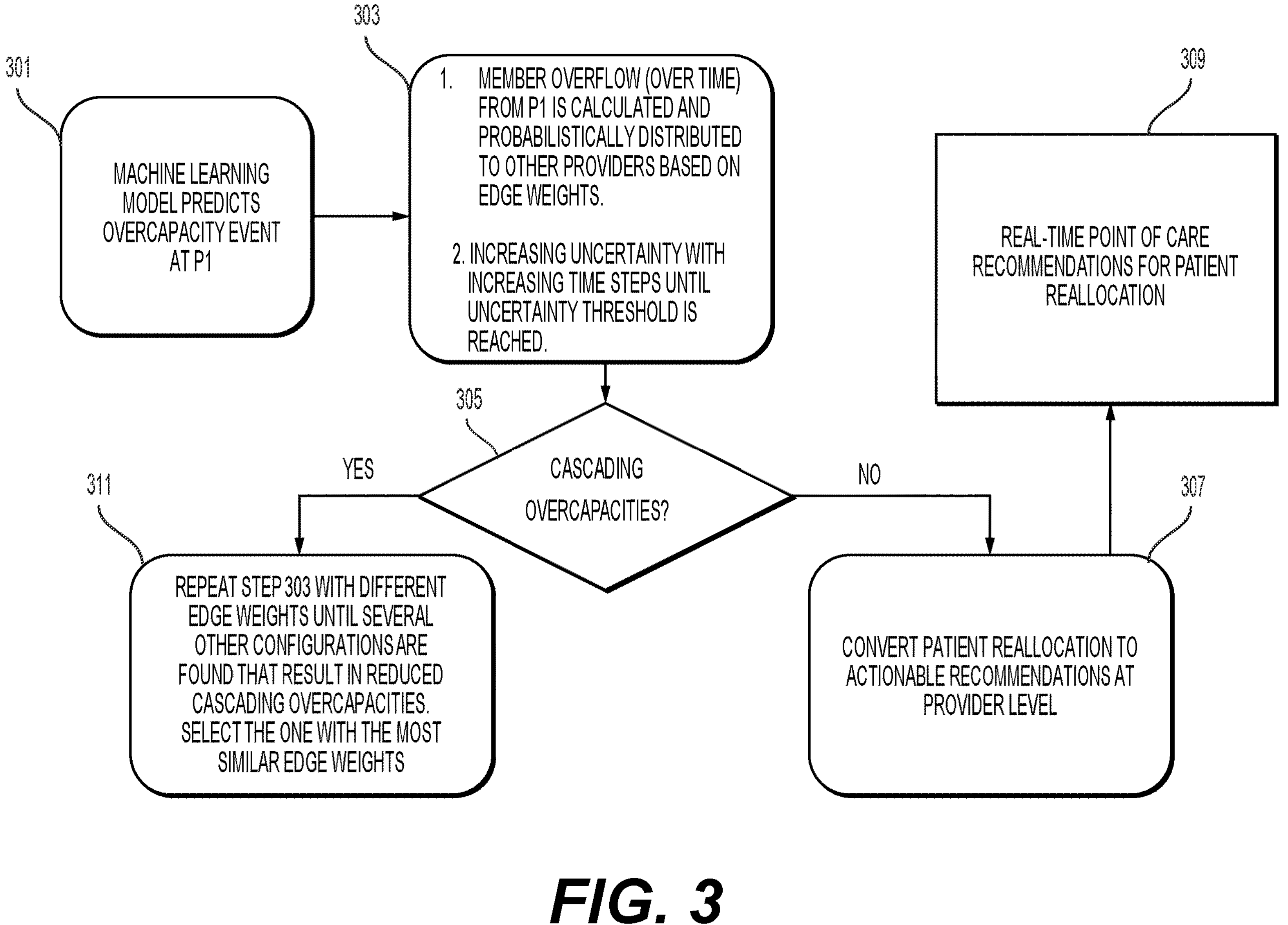
FIG. 3 illustrates a process flow for predicting cascading overcapacity events within a network of providers and activating contingency plans to mitigate the impact of such events on the timeliness of service for the entire network, according to aspects of the disclosure.

FIG. 3 illustrates a process flow for predicting cascading overcapacity events within a network of providers (e.g., first and second systems) and activating contingency plans to mitigate the impact of such events on the timeliness of service for the entire network, according to aspects of the disclosure. In step 301, the prediction platform 113, via the machine learning model, predicts an overcapacity event at a specific provider (e.g., P1 in FIG. 4A) of a network (e.g., a network 400 in FIG. 4A). In one embodiment, the prediction platform 113 receives real-time data associated with the provider(s) from various data systems (e.g., EHR system 111, database 115, etc.). The prediction platform 113 processes the real-time data to generate feature(s) associated with the provider. The prediction platform 113 inputs the feature(s) into the machine learning model to generate a prediction that the node P1 is approaching a capacity threshold in the next instance of time.

The prediction platform 113 generates a graph based on the real-time data, wherein the graph includes network 400 that represents the providers as nodes (e.g., P1, P2, P3, P4, and P5 in FIG. 4A), wherein each of the nodes is defined by node attributes (e.g., patient user volume information, resource utilization information, or staffing information, etc.). It should be understood that the network 400 can include any number of nodes per requirement. The prediction platform 113 monitors, in real-time or near real-time, the capacity information for each of the nodes, and considers the capacity of the network 400, as a whole, to optimize for average timeliness of service. The prediction platform 113 generates, via the user interface module 127, an interface 401 in the UE 103 associated with the provider to notify of the potential overcapacity at the node P1.

In step 303, the prediction platform 113 calculates an overflow of the users (e.g., patients) from the node P1 and distributes the overflow to the other nodes (e.g., P2, P3, P4, and P5 as depicted in FIG. 4B) based on probabilities associated with the other nodes. In one embodiment, the prediction platform 113 determines or generates the connections between the nodes as edges (e.g., 403, 405, 407, 409, 411, and 413 as illustrated in FIG. 4B), wherein each of the edges is defined by edge attributes (e.g., distance/travel time between nodes, capacity information of the nodes, shared facilities, etc.). In one instance, the prediction platform 113 assigns a value (e.g., relative importance) to each edge attribute based on the processing of historical data to determine the influence of the edge attribute on past reallocations of the users. For example, if historical data shows that user reallocations have been more successful when the providers are closer in distance, have shorter travel time, or share more facilities with the original provider, the prediction platform 113 assigns higher values to these attributes while calculating the edge weight for each of the edges. In one instance, the prediction platform 113 utilizes regression techniques to analyze the historical data and identify attributes that are most important in predicting successful user reallocations.

In one embodiment, the prediction platform 113, via the computation module 125, calculates the edge weight for each of the edges based on the assigned values by utilizing various equations, such as:

$$\text{Edge weight} = (\text{distance}^*\text{distance\_patient\_importance}) + (\text{travel\_time}^*\text{travel\_time\_patient\_importance}) + (\text{shared\_facility\_count}^*\text{shared\_facility\_count\_importance}) + (\text{out\_of\_network}^*\text{out\_of\_network\_importance}) + (\text{relative\_quality}^*\text{relative\_quality\_patient\_importance}). \quad \text{Equation 1}$$

$$W_{Pm-Pn} = \frac{\sum_{Pm-Pn} aw}{\sum_{P} W} \quad \text{Equation 2}$$

Equation 2 determines edge weights and indicates that the edge weight (W) of the edge connecting Provider m (Pm) to Provider n (Pn) equals the sum of the edge attributes times their assigned weighting divided by the total sum of all edge weights in the network. For example, the numerator of equation 2 can include equation 1, and the denominator normalizes the edge weight to a range of [0, 1].

For example, the users are more likely to be reallocated to a provider that is close by, has capacity, is in the network, and shares similar services. In this example, nodes P1, P2, and P3 are utilized, but it should be understood any number of nodes could be utilized. P1 has reached its capacity and needs to reallocate some of the users to other nodes to prevent overcapacity. The prediction platform 113, via the computation module 125, calculates the edge weights between the nodes P1, P2, and P3 as follows:

$$\text{weight} = (5 \text{ miles}^* - 0.5) + (30 \text{ minutes}^* - 0.25) + (1 \text{ shared facility}^* 0.25) = -9.75 \quad \text{P1 to P2}$$

$$\text{weight} = (10 \text{ miles}^* 0.5) + (60 \text{ minutes}^* 0.25) + (5 \text{ shared facilities}^* 0.25) = -18.75 \quad \text{P1 to P3}$$

In one embodiment, the prediction platform 113, via the computation module 125, normalizes the edge weights to output probabilities ranging from 0 to 1 by dividing each weight by the sum of all weights. For example:

$$\text{weight} = -9.75/(-9.75 - 18.75) = 0.34 \quad \text{P1 to P2}$$

$$\text{weight} = -18.75/(-9.75 - 18.75) = 0.66 \quad \text{P1 to P3}$$

The prediction platform 113 reallocates patients from P1 to at least one of the other nodes with a probability of reallocation that is proportional to the edge weight. Based on the calculated edge weights, there is a higher probability that users are reallocated from P1 to P3 than from P1 to P2. For example, approximately 66% of the users are reallocated from P1 to P3. The prediction platform 113 determines the cascading effect of the reallocation of the users from the node P1 to at least one of the other nodes (e.g., P3 in FIG. 4C). The prediction platform 113, via the user interface module 127, generates a simulation of the cascading effect. For example, the user reallocation is simulated over the network 400 for several time steps, with secondary and tertiary overcapacity events possible in a cascading fashion. It should be understood that the prediction platform 113 can implement different formulas or equations that takes into account additional factors, such as the type of services provided by the providers, the patient population served, the availability of specialized equipment, the availability of specialized professionals, etc.

In step 303, the prediction platform 113 obtains an uncertainty value for each of the iterated simulations, wherein the uncertainty value is increased with each iterated simulation until an uncertainty threshold is reached. The prediction platform 113, via the computation module 125, calculates an average variance in utilization of one or more actions (e.g., reallocations) based on the prediction and/or the cascading effect during the iterated simulation while reallocating the users from the provider (e.g., node P1) to other providers (e.g., nodes P2, P3, P4, and P5 in FIG. 4C). The prediction platform 113 pauses or ends the simulation upon determining the uncertainty value is equal to or above the uncertainty threshold. In one instance, a final report on the potential future state of the network 400 is generated and displayed in the user interface of UE 103.

In this example, when the patient reallocation is simulated, on average, more patients are reallocated from P1 to P3 than from P1 to P2. However, there would be a variance in the exact patient reallocation upon re-simulation. For example, if 100 patients are reallocated from P1, P3 might end up with varying numbers of users (e.g., 60, 58, 62, 64, etc.) upon re-simulation. An uncertainty is present that compounds as the simulation progresses, but the prediction platform 113 can only tolerate a certain amount of uncertainty before the range of possible outcomes is too large for the prediction platform 113 to state with any confidence what might happen for a certain number of time steps in the future. The prediction platform 113 may utilize the following to handle uncertainty:

1. Calculate the variance and set a limit (e.g., stop the simulation when the variance reaches e.g., 10%); or
2. Determine an appropriate number of time steps to stop the simulation (e.g., stop the simulation after 5 steps).

In step 305, the prediction platform 113 determines whether the reallocation of the users resolves the overcapacity issues in network 400 or results in cascading overcapacity events as a result of the reallocation. In one instance, the prediction platform 113 determines that reallocating users between the nodes of the network 400 (e.g., from P1 to P3) does not result in cascading overcapacity events and none of the nodes are at overcapacity. In step 307, notifications are sent out with actionable recommendations to the affected node (e.g., P1). In one instance, the actionable recommendations include reallocating users to other nodes, bringing additional resources at one or more nodes of the network 400, building temporary facilities at one or more nodes of the network 400 to increase capacity, or implementing triage protocols for prioritizing urgency among the one or more users. In step 309, the prediction platform 113 provides real-time point-of-service (e.g., point-of-care) recommendations for patient reallocation.

In another instance, the prediction platform 113 determines that reallocating users between the nodes of the network 400 (e.g., from P1 to P3) results in cascading overcapacity events. In step 311, the prediction platform 113 iterates step 303 with the different edge weights until other configurations are found that result in reduced cascading overcapacities. For example, the prediction platform 113 generates alternative probabilities for the other nodes to indicate a modified preferability of the other nodes for relocating the users. The prediction platform 113 also generates alternative cascading effects of the reallocation by simulating the reallocation across the network 400 based on the alternative probabilities (e.g., re-simulations). The prediction platform 113 selects the re-simulation (e.g., the alternative cascading effect) that minimizes the impact of the overcapacity event and/or has the most similar edge weights to that of P3. The prediction platform 113 transmits information regarding the selected re-simulation to the affected node (e.g., P1) as a recommended course of action. In one instance, the prediction platform 113 can alter the edge properties of the network 400 to suit the preferences of each users, and the simulations are regenerated with new resultant action plans.

Figure 5B:
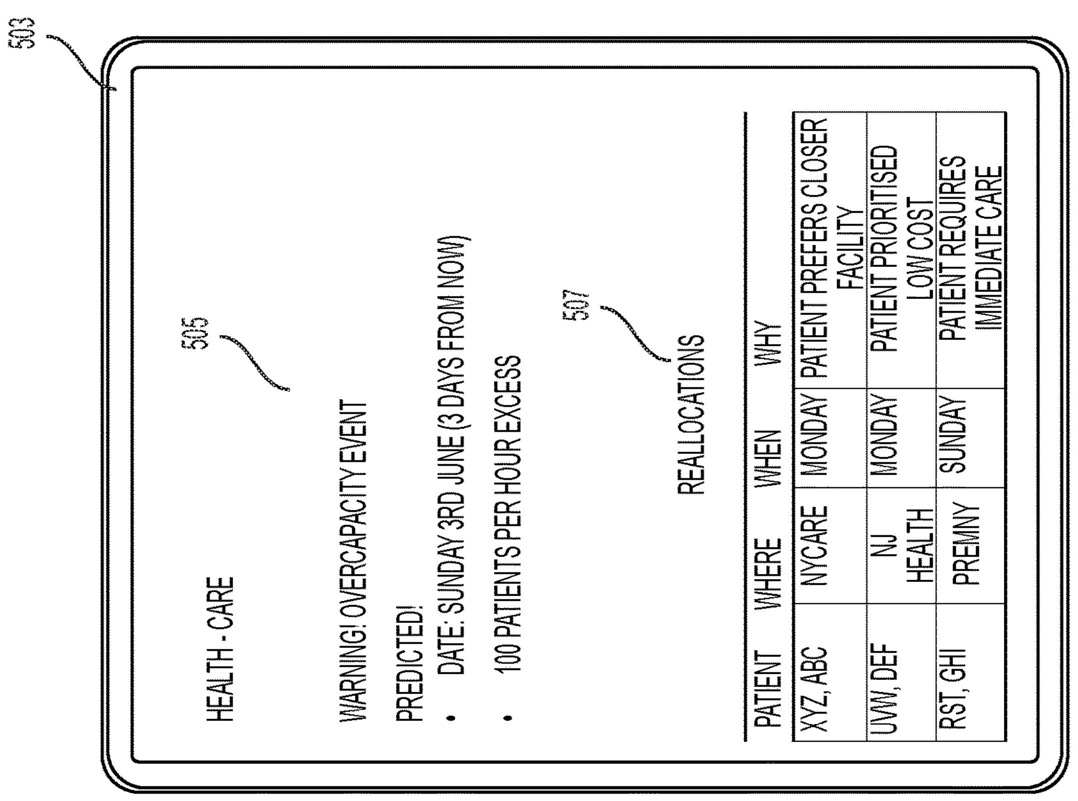
FIG. 5B is a user interface diagram that illustrates a notification for user reallocation in a device associated with the providers, according to aspects of the disclosure.
Figure 5A:
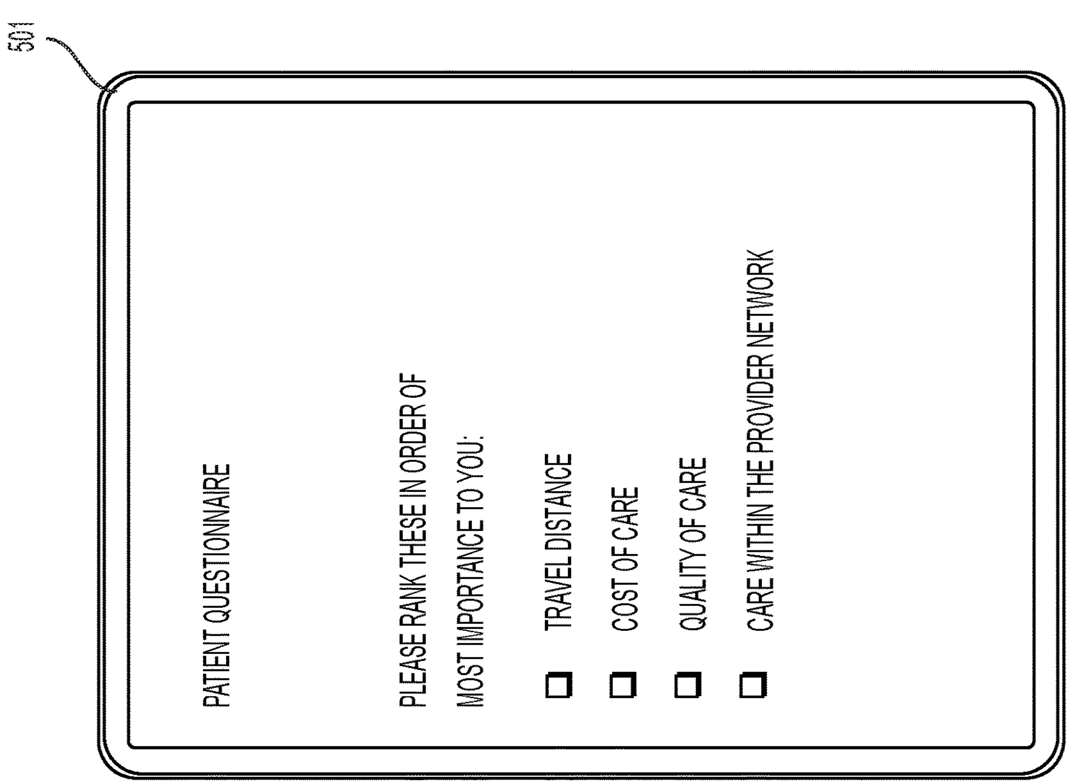
FIG. 5A is a user interface diagram that illustrates questionnaire(s) generated in a device associated with the user(s) for gathering preference information, according to aspects of the disclosure.

FIG. 5A is a user interface diagram that illustrates questionnaire(s) generated in a device associated with a user(s) (e.g., patient(s)) for gathering preference information, according to aspects of the disclosure. In one example embodiment, the prediction platform 113 generates, via the user interface module 127, a user interface 501 in the UE 103 associated with the user(s). The user interface 501 includes a questionnaire that asks the user(s) to rank various attributes associated with the provider(s) (e.g., first and second systems) based on their preference(s). The attributes includes, but are not limited to, travel distance, cost of service, quality of service, and service within the provider network. The questionnaire is presented to the user(s) by textual, graphic, auditory, or any other means in the user interface or the web interface of the UE 103. The user(s) interact with the user interface or a web interface 501 to provide response data (e.g., rank the attributes). The prediction platform 113 processes, via the data processing module 119, the response data to determine the preference information for the user(s). The prediction platform 113 calculates, via the computation module 125, edge weights for the provider(s) based on the preference information. For example, the prediction platform 113 assigns higher weights to attributes that are highly ranked by the user(s). The prediction platform 113 updates the edge weights for the entire network (e.g., network 400) to determine the most optimal resource reallocation.

FIG. 5B is a user interface diagram that illustrates a notification for user reallocation in a device associated with the provider(s) (e.g., first and second systems), according to aspects of the disclosure. In one embodiment, the prediction platform 113 generates, via the user interface module 127, a user interface 503 in the UE 103 associated with the providers. The notifications are presented to the providers by textual, graphic, auditory, or any other means in the user interface or the web interface of the UE 103. In this instance, the user interface 503 includes a textual notification 505 that alerts the providers on the predicted date of overcapacity (e.g., 3$^{rd}$ June, 3 days from the date of prediction) and/or predicted quantity of overcapacity (e.g., an excess of 100 patients per hour) at a particular provider. In another instance, the user interface 503 includes reallocations notification 507 that recommends the provider(s) (e.g., P1 of network 400) on the reallocation of the user(s) to other providers (e.g., P2, P3, P4, or P5 of network 400) to prevent or mitigate the predicted overcapacity. The reallocations notification 507 includes, but is not limited to, the name of the user(s) (e.g., patient(s)), the provider(s) the user(s) are reallocated to, the date of reallocation, and the reason for the reallocation to that specific provider. It should be understood any additional information could be added to the reallocations notification 507 per requirement.

Figure 6:
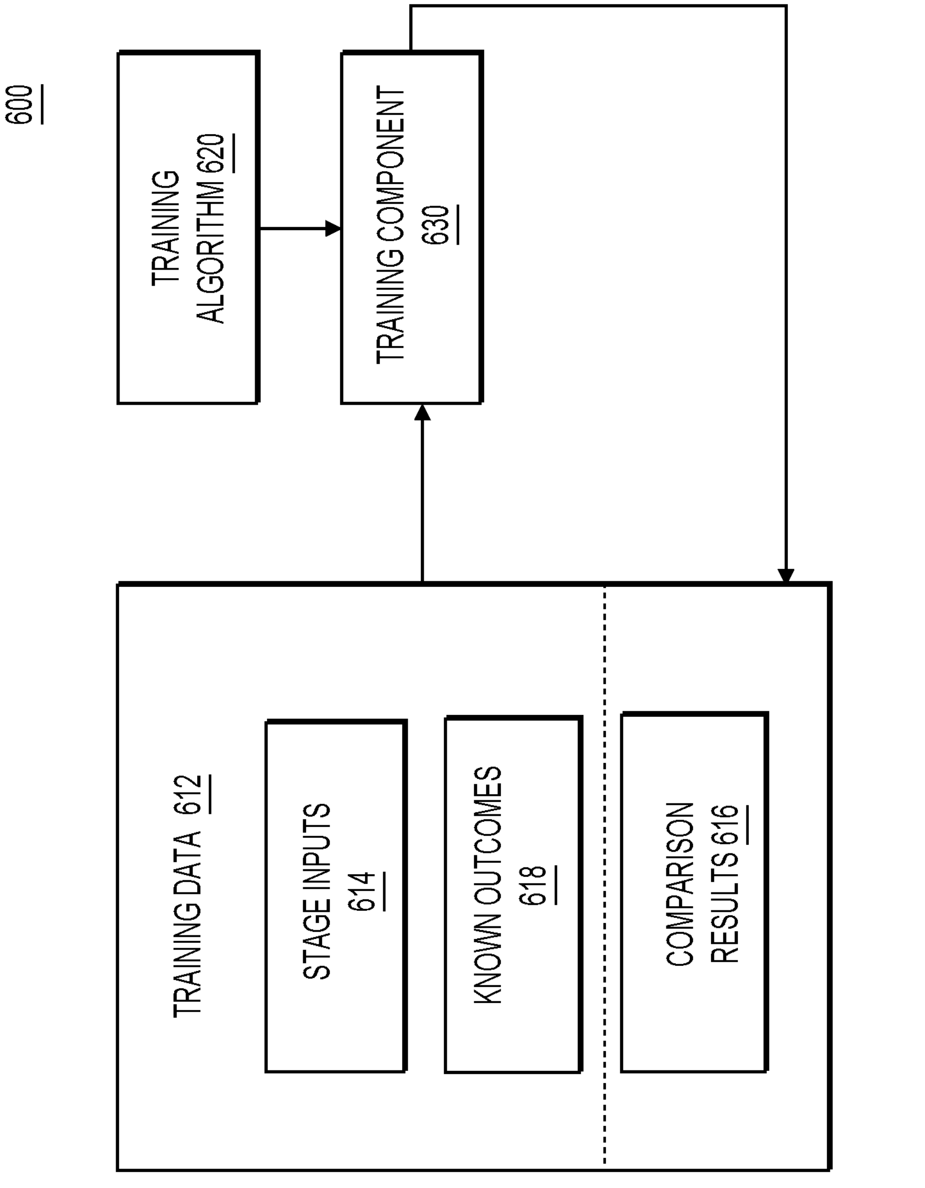
FIG. 6 shows an example machine learning training flow chart.

One or more implementations disclosed herein include and/or are implemented using a machine learning model. For example, one or more of the modules of the prediction platform 113 are implemented using a machine learning model and/or are used to train the machine learning model. A given machine learning model is trained using the training flow chart 600 of FIG. 6. Training data 612 includes one or more of stage inputs 614 and known outcomes 618 related to the machine learning model to be trained. Stage inputs 614 are from any applicable source including text, visual representations, data, values, comparisons, and stage outputs, e.g., one or more outputs from one or more steps from FIG. 2. The known outcomes 618 are included for the machine learning models generated based on supervised or semi-supervised training. An unsupervised machine learning model is not be trained using known outcomes 618. Known outcomes 618 includes known or desired outputs for future inputs similar to or in the same category as stage inputs 614 that do not have corresponding known outputs.

The training data 612 and a training algorithm 620, e.g., one or more of the modules implemented using the machine learning model and/or are used to train the machine learning model, is provided to a training component 630 that applies the training data 612 to the training algorithm 620 to generate the machine learning model. According to an implementation, the training component 630 is provided comparison results 616 that compare a previous output of the corresponding machine learning model to apply the previous result to re-train the machine learning model. The comparison results 616 are used by training component 630 to update the corresponding machine learning model. The training algorithm 620 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the processes illustrated in FIGS. 2 and 3 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

Figure 7:
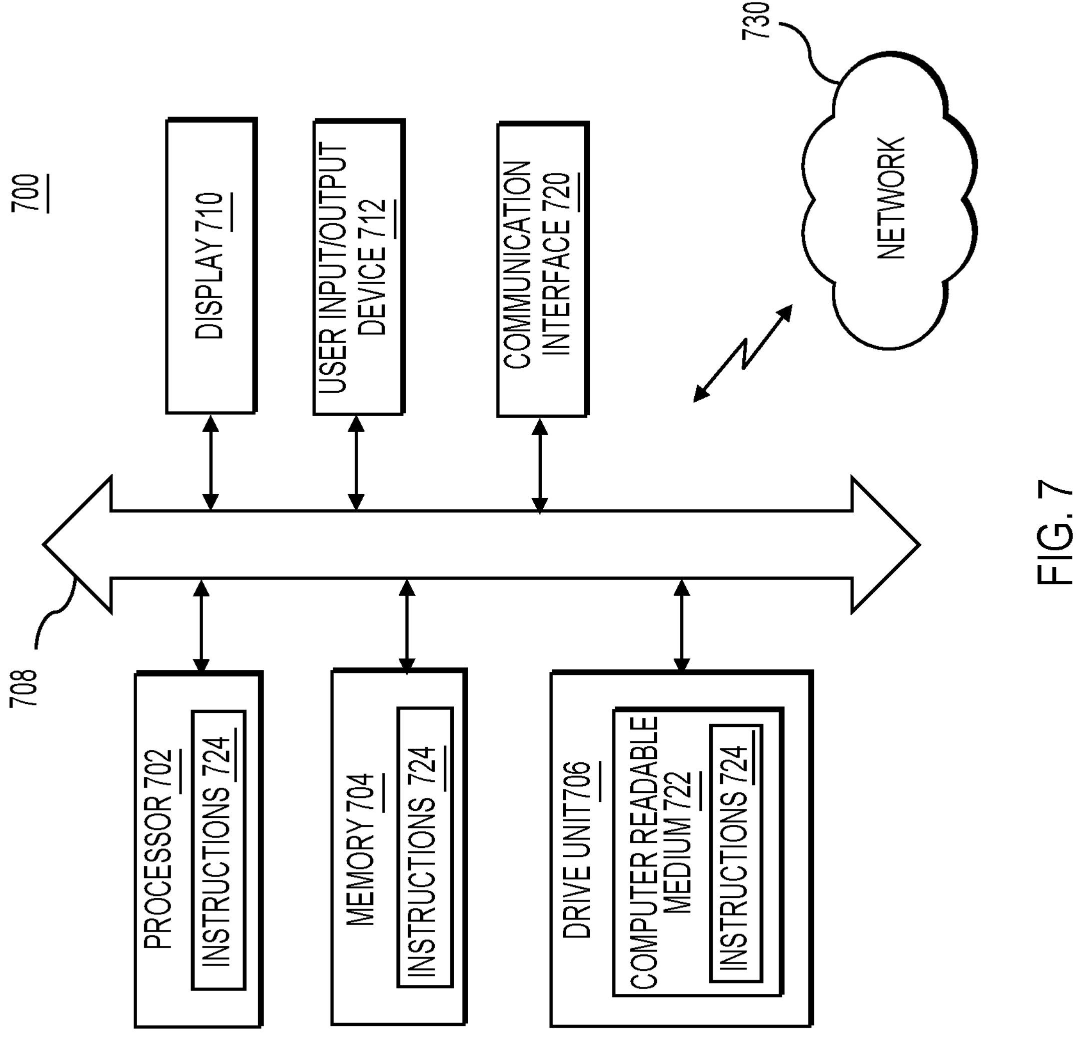
FIG. 7 illustrates an implementation of a computer system that executes techniques presented herein.

FIG. 7 illustrates an implementation of a computer system that executes techniques presented herein. The computer system 700 includes a set of instructions that are executed to cause the computer system 700 to perform any one or more of the methods or computer based functions disclosed herein. The computer system 700 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 700 operates in the capacity of a server or as a client user computer in a server-client user network environment, or as a peer computer system in a peer-to-peer (or distributed) network environment. The computer system 700 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 is implemented using electronic devices that provide voice, video, or data communication. Further, while the computer system 700 is illustrated as a single system, the term "system" shall also be taken to include any collection of systems or systems that individually or jointly execute a set, or multiple sets, of instructions to perform one or more computer functions.

As illustrated in FIG. 7, the computer system 700 includes a processor 702, e.g., a central processing unit (CPU), a graphics processing unit (GPU), or both. The processor 702 is a component in a variety of systems. For example, the processor 702 is part of a standard personal computer or a workstation. The processor 702 is one or more processors, digital signal processors, application specific integrated circuits, field programmable gate arrays, servers, networks, digital circuits, analog circuits, combinations thereof, or other now known or later developed devices for analyzing and processing data. The processor 702 implements a software program, such as code generated manually (i.e., programmed).

The computer system 700 includes a memory 704 that communicates via bus 708. Memory 704 is a main memory, a static memory, or a dynamic memory. Memory 704 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. Memory 704 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts, or tasks illustrated in the figures or described herein are performed by processor 702 executing the instructions stored in memory 704. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 700 further includes a display 710, such as a liquid crystal display (LCD), an organic light emitting diode (OLED), a flat panel display, a solid-state display, a cathode ray tube (CRT), a projector, a printer or other now known or later developed display device for outputting determined information. The display 710 acts as an interface for the user to see the functioning of the processor 702, or specifically as an interface with the software stored in the memory 704 or in the drive unit 706.

Additionally or alternatively, the computer system 700 includes an input/output device 712 configured to allow a user to interact with any of the components of the computer system 700. The input/output device 712 is a number pad, a keyboard, a cursor control device, such as a mouse, a joystick, touch screen display, remote control, or any other device operative to interact with the computer system 700.

The computer system 700 also includes the drive unit 706 implemented as a disk or optical drive. The drive unit 706 includes a computer-readable medium 722 in which one or more sets of instructions 724, e.g. software, is embedded. Further, the sets of instructions 724 embodies one or more of the methods or logic as described herein. Instructions 724 resides completely or partially within memory 704 and/or within processor 702 during execution by the computer system 700. The memory 704 and the processor 702 also include computer-readable media as discussed above.

In some systems, computer-readable medium 722 includes the set of instructions 724 or receives and executes the set of instructions 724 responsive to a propagated signal so that a device connected to network 730 communicates voice, video, audio, images, or any other data over network 730. Further, the sets of instructions 724 are transmitted or received over the network 730 via the communication port or interface 720, and/or using the bus 708. The communication port or interface 720 is a part of the processor 702 or is a separate component. The communication port or interface 720 is created in software or is a physical connection in hardware. The communication port or interface 720 is configured to connect with the network 730, external media, display 710, or any other components in the computer system 700, or combinations thereof. The connection with network 730 is a physical connection, such as a wired Ethernet connection, or is established wirelessly as discussed below. Likewise, the additional connections with other components of the computer system 700 are physical connections or are established wirelessly. Network 730 alternatively be directly connected to the bus 708.

While the computer-readable medium 722 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 722 is non-transitory, and may be tangible.

The computer-readable medium 722 includes a solid-state memory such as a memory card or other package that houses one or more non-volatile read-only memories. The computer-readable medium 722 is a random-access memory or other volatile re-writable memory. Additionally or alternatively, the computer-readable medium 722 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 700 is connected to network 730. Network 730 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 730 includes wide area networks (WAN), such as the Internet, local area networks (LAN), campus area networks, metropolitan area networks, a direct connection such as through a Universal Serial Bus (USB) port, or any other networks that allows for data communication. Network 730 is configured to couple one computing device to another computing device to enable communication of data between the devices. Network 730 is generally enabled to employ any form of machine-readable media for communicating information from one device to another. Network 730 includes communication methods by which information travels between computing devices. Network 730 is divided into sub-networks. The sub-networks allow access to all of the other components connected thereto or the sub-networks restrict access between the components. Network 730 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the present disclosure, various features are sometimes grouped together in a single embodiment, figure, or description thereof for the purpose of streamlining the disclosure and aiding in the understanding of one or more of the various inventive aspects. This method of the present disclosure, however, is not to be interpreted as reflecting an intention that the claimed embodiments require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure are practiced without these specific details. In other instances, well-known methods, structures and techniques have not been shown in detail in order not to obscure an understanding of this description.

Thus, while there has been described what are believed to be the preferred embodiments of the present disclosure, those skilled in the art will recognize that other and further modifications are made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method comprising: receiving, by one or more processors, real-time data associated with a plurality of systems; generating, by the one or more processors, one or more features associated with a first system of the plurality of systems based on at least a portion of the real-time data; generating, by the one or more processors via input of the one or more features into a machine learning model, a prediction that the first system is approaching a capacity threshold; determining, by the one or more processors, one or more probabilities associated with respective one or more second systems of the plurality of systems, each of the one or more probabilities indicating a preferability of the respective second system for reallocating one or more resources from the first system; and simulating, by the one or more processors, the reallocation across the plurality of systems based on the one or more probabilities associated with the respective one or more second systems.

Example 2. The computer-implemented method of example 1, wherein determining the one or more probabilities associated with the respective one or more second systems comprises: generating, by the one or more processors, a graph representing the plurality of systems as nodes and connections between the plurality of systems as edges based on the real-time data associated with the plurality of systems, wherein each of the nodes is defined by one or more node attributes and each of the edges is defined by one or more edge attributes.

Example 3. The computer-implemented method of example 2, wherein determining the one or more probabilities associated with the respective one or more second systems further comprises: processing, by the one or more processors, historical data associated with the plurality of systems to determine an influence of each of the one or more edge attributes on past resource reallocations; assigning, by the one or more processors, a value to each of the one or more edge attributes based on the respective determined influence; and calculating, by the one or more processors, an edge weight for each of the edges based on the respective assigned value.

Example 4. The computer-implemented method of example 3, wherein determining the one or more probabilities associated with the respective one or more second systems further comprises: normalizing, by the one or more processors, the edge weight for each of the edges to output each of the one or more probabilities associated with the respective one or more second systems, wherein normalizing comprises dividing the edge weight for each of the edges by a sum of edge weights of all the edges.

Example 5. The computer-implemented method of any of examples 1-4, wherein simulating the reallocation across the plurality of systems comprises: grouping, by the one or more processors, the one or more resources into one or more subsets based on the one or more probabilities associated with the respective one or more second systems; and simulating, by the one or more processors, the reallocating of the one or more subsets to the respective one or more second systems.

Example 6. The computer-implemented method of any of examples 1-5, further comprising: determining, by the one or more processors, that the simulation does not indicate overcapacity at any of the plurality of systems; and initiating, by the one or more processors, one or more actions based on the prediction and/or the simulation, the one or more actions including providing a reallocation recommendation based on the one or more probabilities.

Example 7. The computer-implemented method of any of examples 1-6, further comprising: determining, by the one or more processors, that the simulation indicates overcapacity at one or more of the plurality of systems; generating, by the one or more processors, multiple sets of one or more alternative probabilities associated with the respective one or more second systems, each of the one or more alternative probabilities indicating a modified preferability of the respective second system for reallocating the one or more resources from the first system; re-simulating, by the one or more processors, the reallocation across the plurality of systems multiple times based on the respective multiple sets of one or more alternative probabilities associated with the respective one or more second systems, the re-simulations associated with a reduced risk of overcapacity to the plurality of systems; selecting, by the one or more processors and from the re-simulations, a re-simulation that is associated with a set of one or more alternative probabilities that are most similar to the one or more probabilities; and initiating, by the one or more processors, one or more actions based on the prediction and/or the selected re-simulation, the one or more actions including providing a reallocation recommendation based on the set of one or more alternative probabilities that corresponds to the selected re-simulation.

Example 8. The computer-implemented method of any of examples 1-7, wherein the simulation of the reallocation across the plurality of systems is iterated for a pre-determined duration or until an uncertainty threshold is reached.

Example 9. The computer-implemented method of example 8, wherein iterating the simulation until the uncertainty threshold is reached comprises: calculating, by the one or more processors, an uncertainty value for each iterated simulation, wherein the uncertainty value increases with each iterated simulation; and pausing, by the one or more processors, the simulation upon determining the uncertainty value is equal to or above the uncertainty threshold.

Example 10. The computer-implemented method of example 9, wherein the uncertainty value indicates an average variance in the reallocation of the one or more resources to the one or more second systems.

Example 11. The computer-implemented method of any of examples 1-10, wherein the machine learning model utilizes exponential smoothing, autoregressive integrated moving average (ARIMA), or long short-term memory (LSTM) neural networks to analyze the one or more features for generating the prediction of overcapacity at any of the plurality of systems.

Example 12. The computer-implemented method of any of examples 1-11, wherein the machine learning model is a trained machine learning model that processes historical data associated with the plurality of systems to learn patterns indicative of an overcapacity event.

Example 13. A system comprising: one or more processors of a computing system; and at least one non-transitory computer readable medium storing instructions which, when executed by the one or more processors, cause the one or more processors to perform operations comprising: receiving real-time data associated with a plurality of systems; generating one or more features associated with a first system of the plurality of systems based on at least a portion of the real-time data; generating, via input of the one or more features into a machine learning model, a prediction that the first system is approaching a capacity threshold; determining one or more probabilities associated with respective one or more second systems of the plurality of systems, each of the one or more probabilities indicating a preferability of the respective second system for reallocating one or more resources from the first system; and simulating the reallocation across the plurality of systems based on the one or more probabilities associated with the respective one or more second systems.

Example 14. The system of example 13, wherein determining the one or more probabilities associated with the respective one or more second systems comprises: generating a graph representing the plurality of systems as nodes and connections between the plurality of systems as edges based on the real-time data associated with the plurality of systems; processing historical data associated with the plurality of systems to determine an influence of each of one or more edge attributes that defines the edges on past resource reallocations; assigning a value to each of the one or more edge attributes based on the respective determined influence; calculating an edge weight for each of the edges based on the respective assigned value; and normalizing the edge weight for each of the edges to output each of the one or more probabilities associated with the respective one or more second systems.

Example 15. The system of any of examples 13-14, wherein simulating the reallocation across the plurality of systems comprises: grouping the one or more resources into one or more subsets based on the one or more probabilities associated with the respective one or more second systems; and simulating the reallocating of the one or more subsets to the respective one or more second systems.

Example 16. The system of any of examples 13-15, further comprising: determining that the simulation does not indicate overcapacity at any of the plurality of systems; and initiating one or more actions based on the prediction and/or the simulation, the one or more actions including providing a reallocation recommendation based on the one or more probabilities.

Example 17. The system of any of examples 13-16, further comprising: determining that the simulation indicates overcapacity at one or more of the plurality of systems; generating multiple sets of one or more alternative probabilities associated with the respective one or more second systems, each of the one or more alternative probabilities indicating a modified preferability of the respective second system for reallocating the one or more resources from the first system; re-simulating the reallocation across the plurality of systems multiple times based on the respective multiple sets of one or more alternative probabilities associated with the respective one or more second systems, the re-simulations associated with a reduced risk of overcapacity to the plurality of systems; selecting, from the re-simulations, a re-simulation that is associated with a set of one or more alternative probabilities that are most similar to the one or more probabilities; and initiating one or more actions based on the prediction and/or the selected re-simulations, the one or more actions including providing a reallocation recommendation based on the set of one or more alternative probabilities that corresponds to the selected re-simulations.

Example 18. A non-transitory computer readable medium storing instructions which, when executed by one or more processors of a computing system, cause the one or more processors to perform operations comprising: receiving real-time data associated with a plurality of systems; generating one or more features associated with a first system of the plurality of systems based on at least a portion of the real-time data; generating, via input of the one or more features into a machine learning model, a prediction that the first system is approaching a capacity threshold; determining one or more probabilities associated with respective one or more second systems of the plurality of systems, each of the one or more probabilities indicating a preferability of the respective second system for reallocating one or more resources from the first system; and simulating the reallocation across the plurality of systems based on the one or more probabilities associated with the respective one or more second systems.

Example 19. The non-transitory computer readable medium of example 18, wherein determining the one or more probabilities associated with the respective one or more second systems comprises: generating a graph representing the plurality of systems as nodes and connections between the plurality of systems as edges based on the real-time data associated with the plurality of systems, wherein each of the nodes is defined by one or more node attributes and each of the edges is defined by one or more edge attributes.

Example 20. The non-transitory computer readable medium of example 19, wherein determining the one or more probabilities associated with the respective one or more second systems further comprises: processing historical data associated with the plurality of systems to determine an influence of each of the one or more edge attributes on past resource reallocations; assigning a value to each of the one or more edge attributes based on the respective determined influence; calculating an edge weight for each of the edges based on the respective assigned value; and normalizing the edge weight for each of the edges to output each of the one or more probabilities associated with the respective one or more second systems.

What is claimed is:

1. A computer-implemented method comprising:

receiving, by one or more processors, real-time data associated with a plurality of systems, the real-time data including volumes of users associated with the plurality of systems;

generating, by the one or more processors, one or more features associated with a first system of the plurality of systems based on at least a portion of the real-time data;

generating, by the one or more processors via input of the one or more features into a machine learning model, a prediction that the first system is approaching a user volume capacity threshold;

determining, by the one or more processors, one or more probabilities indicating a preferability of respective one or more second systems for a reallocation of one or more users from the first system, wherein the preferability of the respective one or more second systems are based at least in part on distances of travel of the one or more users from the first system to the respective one or more second systems, wherein the one or more probabilities are generated by weighting the respective one or more second systems relative to one another based on the distances of travel to produce a probability distribution representing relative likelihoods of reallocating the one or more users among the respective one or more second systems; and simulating, by the one or more processors, the reallocation across the plurality of systems based on the one or more probabilities associated with the respective one or more second systems, wherein the simulating comprises executing, by a simulation model of a modelling pipeline, a plurality of reallocation scenarios that allocate the one or more users among the respective one or more second systems according to the probability distribution.

2. The computer-implemented method of claim 1, wherein determining the one or more probabilities includes:

generating, by the one or more processors, a graph representing the plurality of systems as a plurality of nodes and connections between the plurality of systems as edges based on the real-time data associated with the plurality of systems, wherein individual nodes are defined, respectively, by one or more node attributes, wherein individual edges are defined, respectively, by one or more edge attributes.

3. The computer-implemented method of claim 2, wherein determining the one or more probabilities further includes:

processing, by the one or more processors, historical data associated with the plurality of systems to determine respective influences of individual edge attributes on past user reallocations;

assigning, by the one or more processors, respective values to individual edge attributes based on the respective determined influences; and calculating, by the one or more processors, an edge weight for individual edges based on the respective assigned values.

4. The computer-implemented method of claim 3, wherein determining the one or more probabilities further includes:

normalizing, by the one or more processors, the edge weight for individual edges to output individual probabilities, wherein normalizing comprises dividing the edge weight for individual edges by a sum of edge weights of all the edges.

5. The computer-implemented method of claim 1, wherein simulating the reallocation across the plurality of systems comprises:

grouping, by the one or more processors, the one or more users into one or more subsets based on the one or more probabilities; and simulating, by the one or more processors, the reallocation of the one or more subsets to the respective one or more second systems.

6. The computer-implemented method of claim 1, further comprising:

determining, by the one or more processors, that the simulating indicates that all of the plurality of systems are at or under capacity; and initiating, by the one or more processors, one or more actions based on one or more of the prediction or the simulating, the one or more actions including providing a reallocation recommendation based on the one or more probabilities.

7. The computer-implemented method of claim 1, further comprising:

determining, by the one or more processors, that the simulating indicates overcapacity at one or more of the plurality of systems;

generating, by the one or more processors, multiple sets of one or more alternative probabilities indicating a modified preferability of the respective one or more second systems for reallocating the one or more users from the first system;

re-simulating, by the one or more processors, the reallocation across the plurality of systems multiple times based on the respective multiple sets of one or more alternative probabilities, the re-simulating associated with a reduced risk of overcapacity to the plurality of systems;

selecting, by the one or more processors and from the re-simulating, a re-simulation that is associated with a set of one or more alternative probabilities that are most similar to the one or more probabilities; and initiating, by the one or more processors, one or more actions based on one or more of the prediction or the selected re-simulation, the one or more actions including providing a reallocation recommendation based on the set of one or more alternative probabilities that corresponds to the selected re-simulation.

8. The computer-implemented method of claim 1, wherein the simulating of the reallocation across the plurality of systems is iterated for a pre-determined duration or until an uncertainty threshold is reached.

9. The computer-implemented method of claim 8, wherein iterating the simulating until the uncertainty threshold is reached comprises:

calculating, by the one or more processors, an uncertainty value for individual iterated simulations, wherein the uncertainty value increases over individual iterated simulations; and pausing, by the one or more processors, the simulating upon determining the uncertainty value is equal to or above the uncertainty threshold.

10. The computer-implemented method of claim 9, wherein the uncertainty value indicates an average variance in the reallocation of the one or more users to the respective one or more second systems.

11. The computer-implemented method of claim 1, wherein the machine learning model utilizes exponential smoothing, autoregressive integrated moving average (ARIMA), or long short-term memory (LSTM) neural networks to analyze the one or more features for generating the prediction of overcapacity at any of the plurality of systems.

12. The computer-implemented method of claim 1, wherein the machine learning model is a trained machine learning model that processes historical data associated with the plurality of systems to learn patterns indicative of an overcapacity event.

13. A system comprising:

one or more processors of a computing system; and one or more non-transitory computer readable media storing instructions that, when executed by the one or more processors, cause the one or more processors to perform operations comprising:

receiving real-time data associated with a plurality of systems, the real-time data including volumes of users associated with the plurality of systems;

generating one or more features associated with a first system of the plurality of systems based on at least a portion of the real-time data;

generating, via input of the one or more features into a machine learning model, a prediction that the first system is approaching a user volume capacity threshold;

determining one or more probabilities indicating a preferability of respective one or more second systems for a reallocation of one or more users from the first system, wherein the preferability of the respective one or more second systems are based at least in part on distances of travel of the one or more users from the first system to the respective one or more second systems, wherein the one or more probabilities are generated by weighting the respective one or more second systems relative to one another based on the distances of travel to produce a probability distribution representing relative likelihoods of reallocating the one or more users among the respective one or more second systems; and simulating the reallocation across the plurality of systems based on the one or more probabilities associated with the respective one or more second systems, wherein the simulating comprises executing, by a simulation model of a modelling pipeline, a plurality of reallocation scenarios that allocate the one or more users among the respective one or more second systems according to the probability distribution.

14. The system of claim 13, wherein determining the one or more probabilities includes:

generating a graph representing the plurality of systems as a plurality of nodes and connections between the plurality of systems as edges based on the real-time data associated with the plurality of systems;

processing historical data associated with the plurality of systems to determine respective influences of individual edge attributes that defines the edges on past user reallocations;

assigning values to individual edge attributes based on the respective determined influences;

calculating an edge weight for individual edges based on the respective assigned values; and normalizing the edge weight for individual edges to output the one or more probabilities.

15. The system of claim 13, wherein simulating the reallocation across the plurality of systems comprises:

grouping the one or more users into one or more subsets based on the one or more probabilities; and simulating the reallocation of the one or more subsets to the respective one or more second systems.

16. The system of claim 13, further comprising:

determining that the simulating indicates that all of the plurality of systems are at or under capacity; and initiating one or more actions based on one or more of the prediction or the simulating, the one or more actions including providing a reallocation recommendation based on the one or more probabilities.

17. The system of claim 13, further comprising:

determining that the simulating indicates overcapacity at one or more of the plurality of systems;

generating multiple sets of one or more alternative probabilities indicating a modified preferability of the respective one or more second systems for reallocating the one or more users from the first system;

re-simulating the reallocation across the plurality of systems multiple times based on the respective multiple sets of one or more alternative probabilities, the re-simulating associated with a reduced risk of overcapacity to the plurality of systems;

selecting, from the re-simulating, a re-simulation that is associated with a set of one or more alternative probabilities that are most similar to the one or more probabilities; and initiating one or more actions based on one or more of the prediction or the selected re-simulations, the one or more actions including providing a reallocation recommendation based on the set of one or more alternative probabilities that corresponds to the selected re-simulations.

18. One or more non-transitory computer readable media storing instructions that, when executed by one or more processors of a computing system, cause the one or more processors to perform operations comprising:

receiving real-time data associated with a plurality of systems, the real-time data including volumes of users associated with the plurality of systems;

generating one or more features associated with a first system of the plurality of systems based on at least a portion of the real-time data;

generating, via input of the one or more features into a machine learning model, a prediction that the first system is approaching a user volume capacity threshold;

determining one or more probabilities indicating a preferability of respective one or more second systems for a reallocation of one or more users from the first system, wherein the preferability of the respective one or more second systems are based at least in part on distances of travel of the one or more users from the first system to the respective one or more second systems, wherein the one or more probabilities are generated by weighting the respective one or more second systems relative to one another based on the distances of travel to produce a probability distribution representing relative likelihoods of reallocating the one or more users among the respective one or more second systems; and simulating the reallocation across the plurality of systems based on the one or more probabilities associated with the respective one or more second systems, wherein the simulating comprises executing, by a simulation model of a modelling pipeline, a plurality of reallocation scenarios that allocate the one or more users among the respective one or more second systems according to the probability distribution.

19. The one or more non-transitory computer readable media of claim 18, wherein determining the one or more probabilities includes:

generating a graph representing the plurality of systems as a plurality of nodes and connections between the plurality of systems as edges based on the real-time data associated with the plurality of systems, wherein individual nodes are defined by one or more node attributes and individual edges are defined by one or more edge attributes.

20. The one or more non-transitory computer readable media of claim 19, wherein determining the one or more probabilities further includes:

processing historical data associated with the plurality of systems to determine respective influences of individual edge attributes on past user reallocations;

assigning values to individual edge attributes based on the respective determined influences;

calculating an edge weight for individual edges based on the respective assigned values; and normalizing the edge weight for individual edges to output the one or more probabilities.

* * * * *